US009792240B2

(12) United States Patent
Jose et al.

(10) Patent No.: US 9,792,240 B2
(45) Date of Patent: Oct. 17, 2017

(54) METHOD FOR DYNAMIC CONFIGURATION OF A PCIE SLOT DEVICE FOR SINGLE OR MULTI ROOT ABILITY

(71) Applicant: DELL PRODUCTS, L.P., Round Rock, TX (US)

(72) Inventors: Cyril Jose, Austin, TX (US); Darrell D. Rosser, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 344 days.

(21) Appl. No.: 14/704,049

(22) Filed: May 5, 2015

(65) Prior Publication Data
US 2016/0328344 A1    Nov. 10, 2016

(51) Int. Cl.
| G06F 13/40 | (2006.01) |
| G06F 13/38 | (2006.01) |
| G06F 9/455 | (2006.01) |
| G06F 9/44  | (2006.01) |
| G06F 13/362 | (2006.01) |
| G06F 13/42 | (2006.01) |

(52) U.S. Cl.
CPC ........ *G06F 13/4022* (2013.01); *G06F 9/4411* (2013.01); *G06F 9/455* (2013.01); *G06F 13/385* (2013.01); *G06F 13/4068* (2013.01); *G06F 13/362* (2013.01); *G06F 13/4282* (2013.01)

(58) Field of Classification Search
None
See application file for complete search history.

(56) References Cited

U.S. PATENT DOCUMENTS

| 8,359,415 B2 | 1/2013 | Brown et al. |
| 8,521,941 B2 | 8/2013 | Regula |
| 2014/0040527 A1 | 2/2014 | Kanigicherla et al. |

*Primary Examiner* — Thomas J Cleary
(74) *Attorney, Agent, or Firm* — Isidore PLLC

(57) ABSTRACT

A method and an information handling system (IHS) selectively configures a peripheral component interconnect express (PCIe) device with single or multiple root ability to service various compute node requests. A multi-root aware (MRA) module that manages an MRA switch receives requests for powering on PCIe adapters in respective chassis slot locations. If slot locations of respective PCIe adapters are designated as single root and unshared PCIe device slots, the MRA module provides power to the PCIe adapters and configures the PCIe adapter with single root ability. If slot locations of respective PCIe adapters are designated as multi-root and shared PCIe device slots, and corresponding PCIe adapters are single root input/output virtualization (SR-IOV) aware, the MRA module provides power to corresponding PCIe adapters, and configures, using the appropriate device drivers, the PCIe adapters with multi-root ability. The MRA module connects compute nodes via the MRA switch to requested PCIe device functions.

22 Claims, 5 Drawing Sheets

| Slot No. | 1a | 2a | 3a | 4a | 5a | 6a | 7a | 8a |
|---|---|---|---|---|---|---|---|---|
| Configuration | SR | SR | SR | SR | SR | SR | MR | MR |

METHOD FOR DYNAMIC CONFIGURATION OF A PCIE SLOT DEVICE FOR SINGLE OR MULTI ROOT ABILITY

BACKGROUND

1. Technical Field

The present disclosure generally relates to information handling systems (IHS) and in particular to input/output virtualization adapters within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSes typically include I/O adapters. These I/O adapters also include single root input/output virtualization (SR-IOV) capable adapters. Single-Root Input/Output Virtualization (SR-IOV) is a standard that enables PCIe devices to be shared in order to satisfy virtualization needs. SR-IOV provides a mechanism by which a single root function (e.g., a single Ethernet port) can appear to be multiple separate physical devices. As a result, a PCIe device port can be shared between multiple virtual machines. Consequently, the PCIe devices are shared between the virtual machines without any of the virtual machines having to be aware of the operation of other virtual machines.

A compute node can have one or more hypervisors which host respective VMs. Each hypervisor can be configured to be Single Root Virtualization (SR-IOV) aware and can utilize a SR-IOV-aware endpoint to allocate corresponding virtual adapters/functions (VFs) effectively within the VMs. As a result, an administrator can configure the chassis PCIe slot assignment to use specific SR-IOV aware endpoints as dedicated/non-shared (NS)/single rooted (SR) to one compute node and make use of the above mentioned hypervisor feature to allocate the endpoint virtual adapters/functions within the VMs running on that node for efficient VM access and throughput.

IHSes include a category of systems called converged shared infrastructure systems. A converged infrastructure operates by grouping multiple information technology (IT) components such as other IHSes into a single computing package. Components of a converged infrastructure may include servers, which can include host compute nodes, data storage devices, networking equipment and software for IT infrastructure management. Converged infrastructure provides centralized management of IT resources, system consolidation, increased resource-utilization rates, and lower operational costs.

In systems where a converged infrastructure (e.g., the PowerEdge VRTX) is utilized, a SR-IOV-aware PCIe endpoint utilizing the chassis integrated Multi Root Aware (MRA) switch and associated management solution can perform as shared/multi-rooted (MR) endpoint device. The MRA switch along with management solution exposes the SR-IOV endpoint virtual adapters/functions within the switch bridges to be exposed as multi rooted. As a result, an administrator can configure the chassis PCIe slot assignment to use a specific SR-IOV endpoint as an MR endpoint (enabling more than one chassis compute node to have access to endpoint through it virtual adapters/functions) facilitating VMs hosted across the compute nodes to have access to a common shared Input-Output (IO) medium like shared storage.

Device endpoints are statically enabled to either perform as shared or dedicated among root compute nodes. The underlying ability for a user to make a dynamic and flexible slot device configuration does not exist, and the end user does not have the means to choose whether an endpoint device operates as a MR/shared endpoint or as a non-MR/unshared endpoint. The static nature of the configurability also impedes or prevents manufacturing from leveraging a device agnostic approach for configuration operations when providing firmware updates at a factory. Factory infrastructure have had to implement specific processing logic with the introduction of shared-only devices adding further complexity within factory debug and implementation instructions.

As a result of these static configurations, both the first approach, in which SR-IOV aware endpoints are utilized as dedicated/non-shared (NS)/single rooted (SR) for one compute node, and the second approach involving the converged shared infrastructure and management solutions have a number of limitations with respect to flexibility in realizing multiple different types of requests including requests to use SR-IOV-aware adapters/endpoints as dedicated/non-shared (NS)/single rooted (SR) and as a shared or multi-rooted (MR) endpoint device.

BRIEF SUMMARY

Disclosed are a method and an information handling system (IHS) that selectively configures a peripheral component interconnect express (PCIe) device with single or multiple root ability to fulfill/service various compute node requests. According to one aspect, a multi-root aware (MRA) module that manages a MRA switch receives from a chassis management controller (CMC) requests for powering on PCIe adapters in various chassis slot locations managed by and/or coupled to the MRA module. The received request can be based on one or more user requests for PCIe adapter functionality. If slot locations of respective PCIe adapters are designated as single root and unshared PCIe device slots, the MRA module provides power to the PCIe adapters and configures the PCIe adapter with single root ability. If slot locations of respective PCIe adapters are designated as multi-root and shared PCIe device slots, and corresponding PCIe adapters are single root input/output virtualization (SR-IOV) aware, the MRA module provides power to corresponding PCIe adapters, and configures, using the appropriate device drivers, the PCIe adapters with multi-root ability. The MRA module connects compute nodes via the MRA switch to requested PCIe device functions.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 illustrates a table representing a slot configuration map used to support dynamic configuration of a PCIe slot device for single root or multi-root ability within an IHS, according to one embodiment;

DETAILED DESCRIPTION

Figure 1:
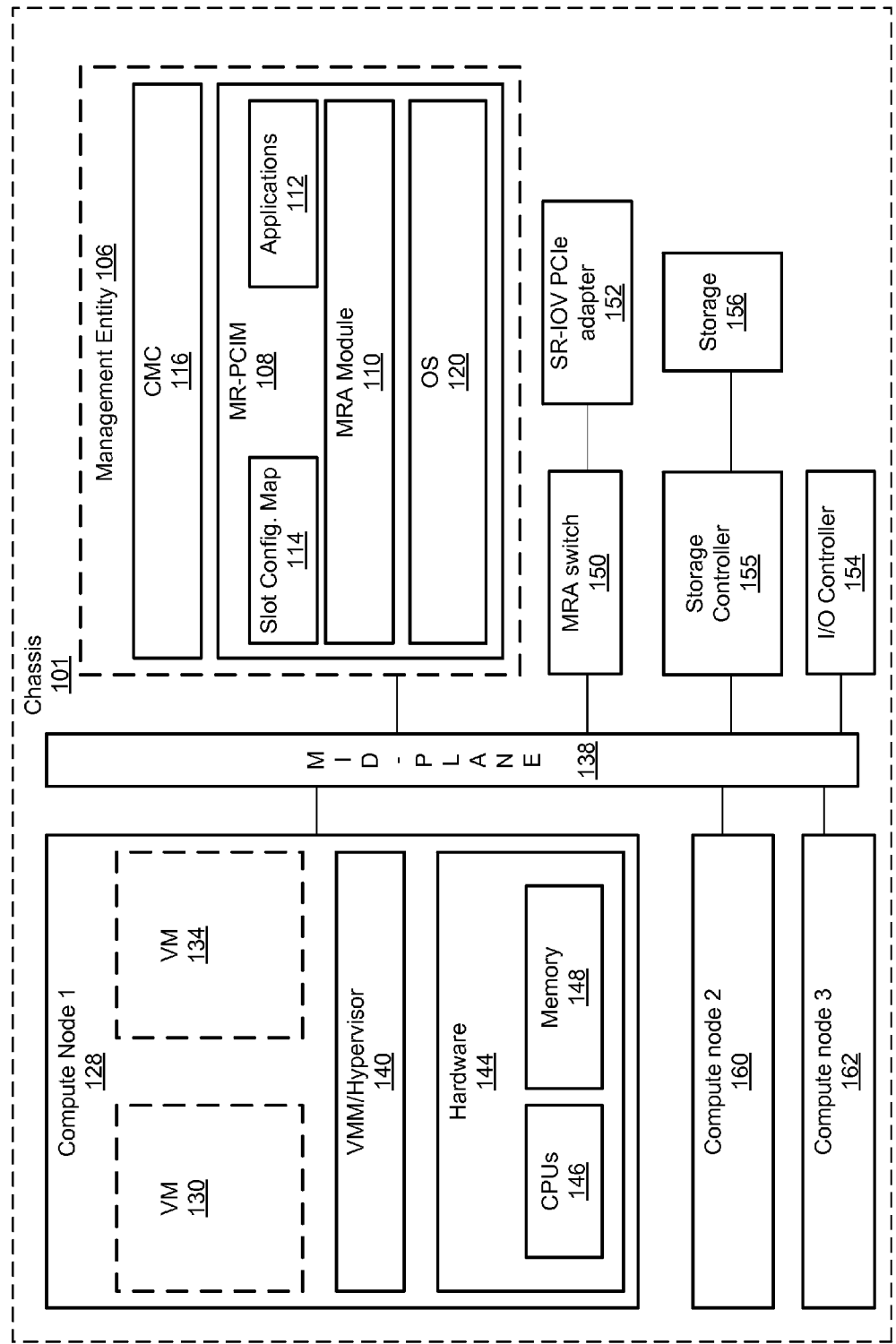
FIG. 1 illustrates an example information handling system (IHS) within which various aspects of the disclosure can be implemented, according to one or more embodiments.

The illustrative embodiments provide a method and an information handling system (IHS) that selectively configures a peripheral component interconnect express (PCIe) device with single or multiple root ability to fulfill various host compute node requests. According to one aspect, a multi-root aware (MRA) module executing within an MR-PCIM node that manages an MRA switch receives requests from a chassis management controller (CMC) requests for powering on (i.e., providing power to) PCIe adapters in various chassis slot locations managed by and/or coupled to the MRA module. The request can be based on one or more user requests for PCIe adapter functionality. If slot locations of respective PCIe adapters are designated as single root and unshared PCIe device slots, the MRA module provides power to the PCIe adapters and configures the PCIe adapter with single root ability. If slot locations of respective PCIe adapters are designated as multi-root and shared PCIe device slots, and corresponding PCIe adapters are single root input/output virtualization (SR-IOV) aware and have specific functions to support an MRA switch plug-in, the MRA module provides power to corresponding PCIe adapters and configures the PCIe adapters with multi-root ability. The MRA module connects host compute nodes via the MRA switch to target/requested PCIe device functions.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of IHS 100/400 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 illustrates a system that includes virtualized components/resources. IHS 100 includes management entity 106 which includes multi-root PCIe manager node (MR-PCIM) 108 and chassis management controller (CMC) 116. IHS 100 also includes first compute node 128 having a virtual machine manager (VMM)/Hypervisor 140, first virtual machine (VM) 130 and second VM 134. First compute node 128 also includes hardware 144, which includes central processing units (CPUs)/processors 146 and memory 148. Processor(s) 146 are coupled to memory 148 via system interconnect (not shown). The system interconnect can be interchangeably referred to as a system bus, in one or more embodiments. In addition, IHS 100 comprises second compute node 160 and third compute node 162.

IHS 100 further comprises an I/O infrastructure non-stop signal mid-plane illustrated as mid-plane 138. Mid-plane 138 provides the internal wiring between the server or storage blades and the interconnect modules. Non-stop signal mid-plane 138 is a passive board that uses serializer/deserializer (SerDes) technology to incorporate multiple protocols and provide point-to-point connectivity between device bays and interconnect bays.

IHS 100 also includes MRA switch 150 and I/O controller 154, which are both coupled to mid-plane 138. In addition, IHS 100 comprises SR-IOV PCIe adapter 152 which is coupled to MRA switch 150. Also included in IHS 100 is storage 156 within which can be stored one or more software and/or firmware modules and/or data (not specifically shown). In one implementation, storage 156 is coupled to mid-plane 138 via storage controller 155. In one embodiment, storage 156 can be a hard drive or a solid state drive. The one or more software and/or firmware modules within storage 156 can be loaded into memory 148 during operation of IHS 100. The various software and/or firmware modules have varying functionality when their corresponding program code is executed by processor(s) 146 or other processing devices within IHS 100.

MR-PCIM 108 can include therein a plurality of modules which are provided by memory 148 or storage 156. In particular, MR-PCIM 108 can include Basic Input/Output System (BIOS) (not shown), operating system (O/S) 120, application(s) 112, slot configuration map 114 and multi-root aware (MRA) module 110. In one or more embodiments, the BIOS comprises additional functionality associated with unified extensible firmware interface (UEFI).

As illustrated, IHS 100 comprises a single root IOV PCIe adapter 152. SR-IOV PCIe adapter 152 enables IHS 100 to communicate and/or interface with other devices, services, and components that are located external to IHS 100 and/or on a chassis external to a chassis location of host compute nodes 160 and 162. These devices, services, and components can interface with IHS 100 via an external network (not shown), such as a wide area network (e.g., the Internet), using one or more communication protocols. In particular, in one implementation, IHS 100 uses SR-IOV PCIe adapter 152 to connect to a remote/support IHS (not shown) via an external network.

The external network can be a wired local area network, a wireless wide area network, wireless personal area network, wireless local area network, and the like, and the connection to and/or between the external network and IHS 100 can be wired or wireless or a combination thereof.

Figure 2:
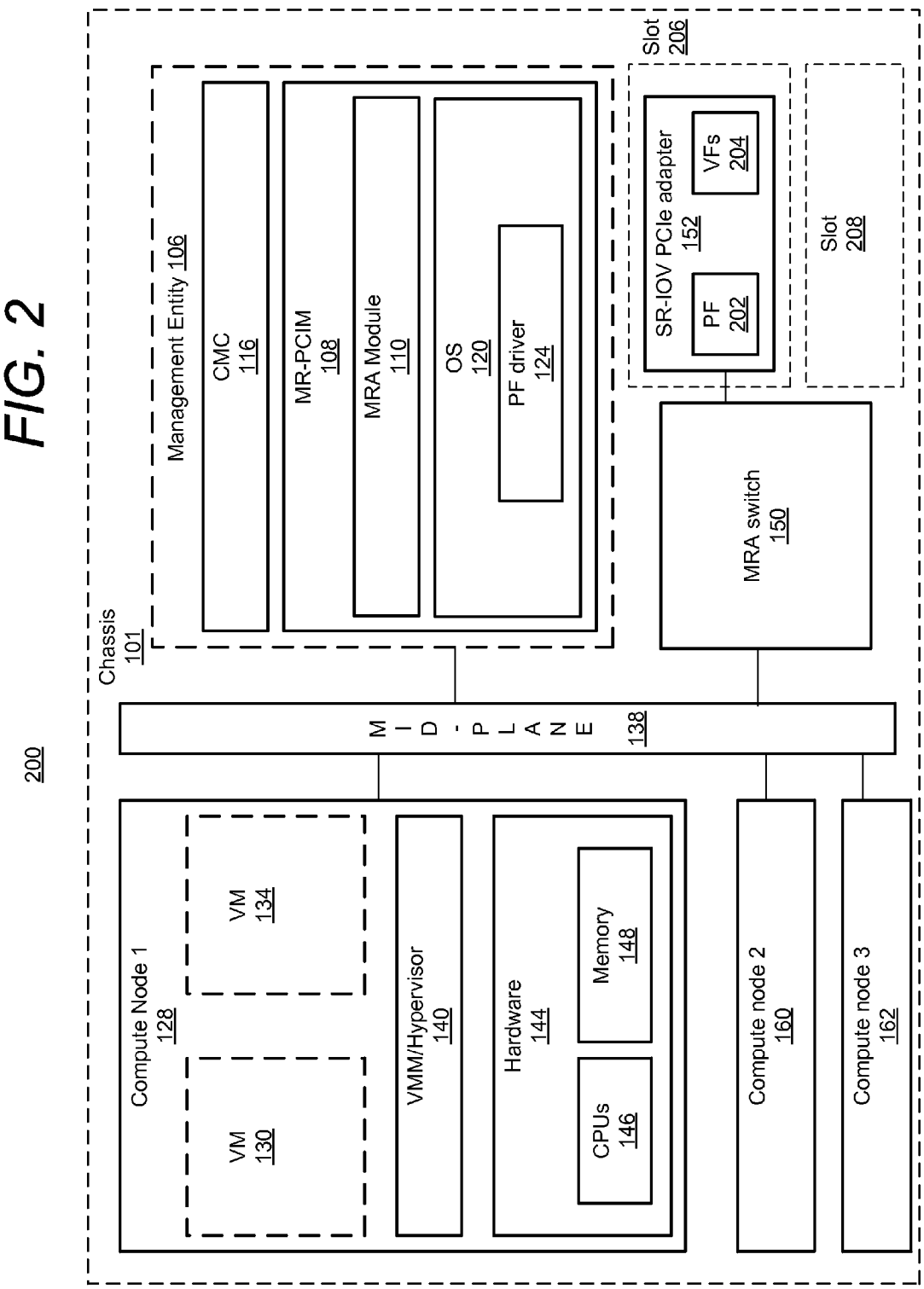
FIG. 2 depicts another view of the IHS, according to one or more embodiments.

With specific reference now to FIG. 2, there is depicted another view of the IHS, according to one or more embodiments. IHS 200 has a somewhat identical configuration to the configuration of IHS 100. However, a number of components including I/O controller 154 and storage controller 155 of IHS 100 are not shown in IHS 200 in order to provide an expanded view of components of SR-IOV PCIe adapter 152 and of components connected to MRA switch 150. As illustrated in IHS 200, SR-IOV PCIe adapter 152 comprises physical function (PF) 202 and virtual function(s) (VFs) 204. As further illustrated, MRA switch 150 is positioned adjacent to and/or coupled to components (e.g., SR-IOV PCIe adapter 152) in first slot 206 and second slot 208, respectively.

In IHS 200, MRA module 110 enables host compute nodes to access shared and unshared PCIe adapter/device functionality. In addition, MRA module 110 enables virtual machines on respective compute nodes, such as first compute node 128, to access shared and unshared PCIe adapter/device functionality. Illustrated within MR-PCIM 108 is host OS 120 comprising physical function (PF) driver 124 which is used to manage a physical function of a corresponding SR-IOV adapter.

Chassis Management Controller (CMC) 116, which is the systems management solution for the chassis, is aware of chassis components and server/host compute nodes in addition to MR-PCIM 108. CMC 116 exposes methods to manage both the server node and PCIe complex. In one implementation, CMC 116 and MR-PCIM 108 co-exist in a single physical controller environment. In another implementation, CMC 116 and MR-PCIM 108 reside in separate physical controllers, as is found, for example, in the PowerEdge™ VRTX implementation. Multi Root Aware (MRA) switch 150 allows routing of adapter functions (e.g., Virtual Functions (VFs) of SR-IOV devices and base functions of non-SR-IOV devices) to root port functions through a management interface referred to as a virtual hierarchy (VH) in a multi-root topology.

Figure 3:
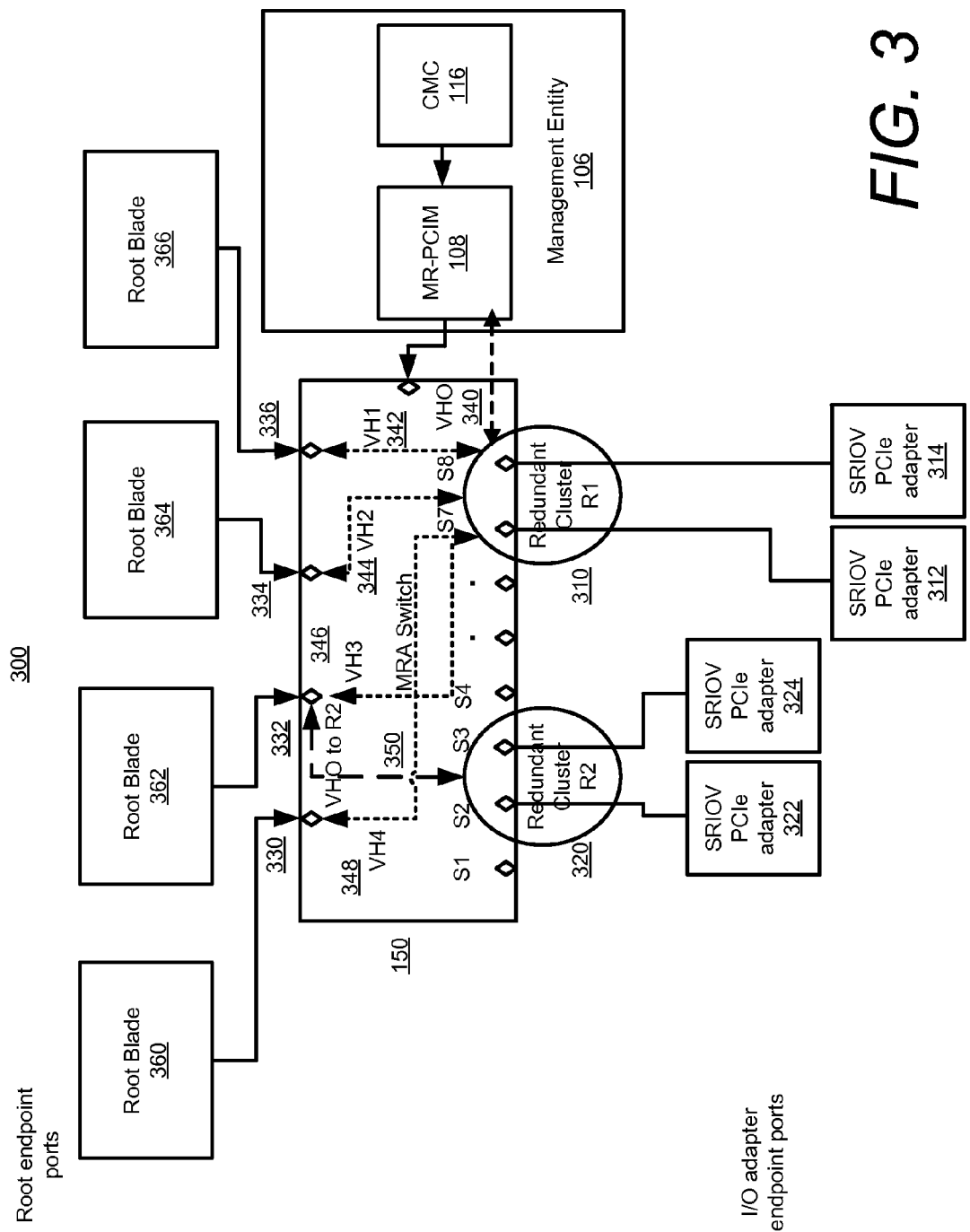
FIG. 3 illustrates a multi-root aware (MRA) switch coupled to a peripheral component interconnect express (PCIe) device, and a management entity that dynamically configures the PCIe slot device for single root or multi-root ability within an IHS, according to one embodiment.

FIG. 3 illustrates a multi-root aware (MRA) switch coupled to a peripheral component interconnect express (PCIe) device. FIG. 3 further illustrates a management entity that dynamically configures the PCIe slot device for single root or multi-root ability within an IHS, according to one embodiment. IHS 300 comprises multiple host compute nodes represented by first root blade 360, second root blade 362, third root blade 364 and fourth root blade 366. IHS 300 also comprises multi-root aware (MRA) (PCIe) switch 150 having multiple root endpoint ports and multiple input/output (I/O) adapter ports. MRA switch 150 is coupled to root blades 360, 362, 364 and 366 via the multiple root endpoint ports, which include first endpoint port 330, second endpoint port 332, third endpoint port 334 and fourth endpoint port 336, respectively. IHS 300 also comprises first single root input/output virtualization (SR-IOV) PCIe adapter 312 and second/alternate SR-IOV PCIe adapter 314 collectively representing a first redundant adapter cluster configured with multi-root ability. In addition, IHS 300 comprises third SR-IOV PCIe adapter 322 and fourth/alternate SR-IOV PCIe adapter 324 collectively representing a second redundant adapter cluster configured with single root ability. MRA switch 150 is coupled to the first and second redundant adapter clusters via first and second redundant port clusters (R1) 310 and (R2) 320, respectively. In particular, MRA switch 150 is coupled to first SR-IOV PCIe adapter 312 and second/alternate SR-IOV PCIe adapter 314 via first I/O adapter port S7 and second/alternate adapter port S8, respectively (collectively representing first redundant port cluster 310). In addition, MRA switch 150 is coupled to third SR-IOV PCIe adapter 322 and fourth/alternate SR-IOV PCIe adapter 324 via third I/O adapter port S2 and fourth/alternate adapter port S3, respectively (collectively representing second redundant port cluster 320). Although, one alternate SR-IOV PCIe adapter is shown within each redundant adapter cluster, a redundant adapter cluster can have multiple alternate SR-IOV PCIe adapters, and the disclosure is not limited by any depicted number of alternate SR-IOV PCIe adapters.

IHS 300 further comprises management entity 106 which includes multi-root PCIe manager node (MR-PCIM) 108 and one or more chassis management controller(s) (CMCs) 116. MR-PCIM 108 is communicatively coupled to MRA PCIe switch 150 via virtual hierarchy (VH0) 340, which is used to manage MR-IOV features of SR-IOV PCIe adapters/devices. Also illustrated within MRA switch 150 are first virtual hierarchy (VH1) 342, second virtual hierarchy (VH2) 344, third virtual hierarchy (VH3) 346 and fourth virtual hierarchy (VH4) 348. Additionally, "VH0 to R2" link 350 is illustrated within MRA switch 150. "VH0 to R2" link 350 communicatively couples second root blade to single rooted adapter device functions.

In IHS 300, chassis management controller (CMC) 116 receives one or more user requests for PCIe adapters. CMC 116 can initiate/generate one or more power-on (i.e., power activation) process requests for one or more I/O adapter devices. In particular, CMC 116 receives user requests to access I/O adapter functionality from one or more host compute nodes. In response to receiving user requests, CMC 116 initiates one or more corresponding requests for powering on PCIe adapters based on a current power state of PCIe adapters available to service the user requests. Multi-root PCIe manager node (MR-PCIM) 108 receives the power-on request(s) from CMC 116 and manages MRA PCIe switch 150 and an associated PCIe sub-system. MR-PCIM 108 and/or MRA module 110 retrieves and uses slot configuration map 114 (FIG. 1) to determine whether a chassis PCIe slot location assigned to an I/O adapter device for which power is requested is designated as a multi-root (MR) capable device slot (i.e., the chassis slot is configured for multi-root ability). In response to determining that the chassis PCIe slot location assigned to the I/O adapter device is designated as a multi-root (MR) (capable) device slot, MRA module 110 determines whether the I/O adapter for which power is requested is SR-IOV aware with necessary functions as defined in the PCIe MR-IOV specification. These functions are configured using corresponding device drivers to support an MRA switch plug-in. In response to determining that the I/O adapter is not SR-IOV aware and does not have the specified functions to support an MRA switch plug-in, MRA module 110 provides power to the slot and adapter, and MRA module 110 configures the I/O adapter with single root capability. However, in response to determining that the I/O adapter is SR-IOV aware with the specified functions to support an MRA switch plug-in, MRA module 110 provides power to the slot and I/O adapter. In addition, MRA module 110 exposes functions for SR-IOV capability, and configures the I/O adapter with multi-root ability. However, in response to determining that the chassis PCIe slot location is configured (i.e., by assignment via slot configuration map 114) for single root (SR) ability, as opposed to MR ability, MRA module 110 provides power to the slot and adapter, and MRA module 110 configures the I/O adapter with single rooted device ability.

MRA module 110 can further determine whether an adapter cluster having a first I/O adapter and a second/alternate adapter is SR-IOV aware. If MRA module 110 determines that the first I/O adapter cluster is SR-IOV aware and has the specified functions, MRA module 110 provides power to chassis slots and the respective I/O adapters. In addition, MRA module 110 loads the corresponding device specific SR-IOV physical function drivers. The specified functions can be configured by available driver capabilities, and enable respective I/O adapters to be connected to the MRA switch.

According to one or more aspects, MRA module 110 receives from CMC 116 a first request for powering on a first I/O adapter assigned to a chassis slot location to be configured for multi-root ability. MRA module 110 receives from CMC 116 a second request for powering on a second I/O adapter assigned to a chassis slot location to be configured for single rooted device ability. Based on the respective requests, MRA module 110 configures the first I/O adapter for multiple root ability, and MRA module 110 configures the second I/O adapter for single root ability, while the first I/O adapter is configured for multi-root ability.

MRA module 110 receives via CMC 116 at least one request from respective host compute nodes, including a first request from a first host compute node, to assign PCIe device functions to respective compute nodes present in the chassis. More specifically, MRA module 110 receives from CMC 116 a request(s) for assigning respective virtual and/or physical PCIe device functions to the requesting compute nodes. MRA module 110 determines from the received first request whether the first host compute node is requesting a device configured with multi-root ability. In response to determining that the first host compute node is requesting a PCIe device configured with multi-root ability, MRA module 110 connects, to the first host compute node, virtual functions provided by an I/O adapter (e.g., SR-IOV PCIe adapter 312) in the first, multi-root adapter cluster and in a chassis slot location assigned to the PCIe adapter device configured with multi-root ability. However, in response to determining that the first host compute node has requested a PCIe device configured with single root ability as opposed to multi-root ability, MRA module 110 connects, to the first host compute node, a physical function provided by an I/O PCIe adapter (e.g., SR-IOV PCIe adapter 322) configured with the single root capability in the second adapter cluster and in the assigned chassis slot location.

In one or more related aspects, in addition to receiving a first request from a first host compute node to assign a PCIe device function to the first compute node, MRA module 110 receives via CMC 116 a second request from a second host compute node to assign a PCIe device function to the second compute node. MRA module 110 determines from the received second request whether the second host compute node is requesting a device configured with multi-root ability. If MRA module 110 determines from the first and second requests that the first host compute node is requesting a device configured with multi-root ability and the second host compute node is requesting a device configured with single root ability, MRA module 110 services the first request by providing a device configured with multi-root ability while MRA module 110 services the second request by providing a device configured with multi-root ability. In particular, MRA module 110 connects, to the second compute node, a physical function provided by an adapter (e.g., SR-IOV PCIe adapter 322) configured with single root ability in the second adapter cluster and in an assigned chassis slot location. However, virtual device functions (VFs) can be assigned to respective VMs via corresponding compute node assignment. Contemporaneously, MRA module 110 provides virtual functions to one or more compute nodes, including the first compute node, by an adapter (e.g., SR-IOV PCIe adapter 312) configured with multi-root ability within the first adapter cluster and in a corresponding chassis slot location.

According to other aspects, MRA module 110 routes virtual functions (VFs) of SR-IOV adapters through MRA switch 150 via the VH0 management interface. In addition, MRA module 110 assigns the VH0 management interface to respective compute nodes to provide compute nodes with adapter management access and to enable compute nodes to route base functions for single rooted devices to said compute nodes via MRA switch 150.

MRA module 110 loads at least one adapter in the first adapter cluster, as a shared device that can be connected to respective compute nodes via VH1 to VHN. In addition, MRA module 110 loads at least one adapter in the second adapter cluster as an unshared device that can be connected to a single, respective compute node via a respective VH0. The adapter(s) in the first adapter cluster and the adapter(s) in the second adapter cluster are substantially identically configured as SR-IOV adapter devices. In one or more embodiments, an adapter cluster can include one or more of a local adapter device and a remote adapter device.

In response to power-on procedures being completed for corresponding adapter devices, MRA module 110 determines whether a respective powered-on device exposes multiple virtual functions, as provided by SR-IOV devices in multi-root configured slots. In response to determining that respective powered on devices expose multiple virtual functions, MRA module 110 provides routing assignments that connects the virtual functions to respective compute nodes via corresponding virtual hierarchy connections exposed by the MRA switch. In response to determining that respective powered-on devices expose single physical functions of respective adapter devices, MRA module 110 provides routing assignments that connects the physical functions to respective compute nodes via corresponding virtual hierarchy connections exposed by MRA switch 150.

MRA module 110 enables PF driver 124 to identify I/O adapter device settings and enumerate the configuration address space for the I/O adapter device's virtual functions. PF driver 124 provides configuration space enumeration.

FIG. 4 illustrates a table representing a slot configuration map used to support dynamic configuration of a PCIe slot device for single root or multi-root ability within an IHS, according to one embodiment. Table 400 comprises two rows each having nine (9) columns including first row 402 having a first row header/identifier depicted as "Slot No." within a first column. First row 402 also includes actual identified chassis slot numbers within a remaining eight (8) columns, respectively. Second row 404 has a second row header/identifier depicted as "Configuration" within a first column of second row 404. Second row 404 identifies a type of configuration from among a single root (SR) ability and multi-root (MR) ability within a remaining 8 columns of second row 404. As illustrated, second row 404 identifies a configuration type assigned to a corresponding identified chassis slot number of first row 402. First row 402 indicates that the identified slot numbers comprise 1a, 2a, 3a, 4a, 5a, 6a, 7a and 8a. Table 400 further indicates, using second row 404, that slots 1a, 2a, 3a, 4a, 5a and 6a are allocated to PCIe devices each configured for single root (SR) ability, where slots 2a and 3a, for example, can represent second redundant cluster 320 (FIG. 3), while slots 7a and 8a can represent first redundant cluster 310 (FIG. 3) corresponding to a pair of PCIe adapter/devices each configured with multi-root (MR) ability.

In IHS 300, MRA module 110 receives from CMC 116 a request for powering on an I/O adapter and retrieves slot configuration map 114 (FIG. 1), which is represented by table 400. MRA module 110 determines from the retrieved slot configuration map whether a chassis PCIe slot location assigned to an I/O adapter device for which power is requested is configured as a multi-root (MR) device slot. In response to determining that the chassis PCIe slot location assigned to the I/O adapter device is configured as a multi-root (MR) device slot, MRA module 110 configures the I/O adapter device with multi-root ability as long as MRA module 110 can appropriately configure the I/O adapter using available drivers. However, if MRA module 110 determines that the chassis PCIe slot location assigned to the I/O adapter device for which power is requested is configured as a single root (SR) device slot, MRA module 110 configures the I/O adapter device with single root ability.

Based on end user preferences and/or needs, slot configuration map 114 (FIG. 1) can be updated by a user, on demand, to make use of interfaces such as application programmable interfaces (APIs) exposed by CMC 116. MRA module 110 utilizes this user requested and updated slot configuration to dynamically configure respective devices as shared devices corresponding to slots configured for multi-root/shared ability, and unshared devices corresponding to slots configured for single root/unshared ability.

Figure 5:
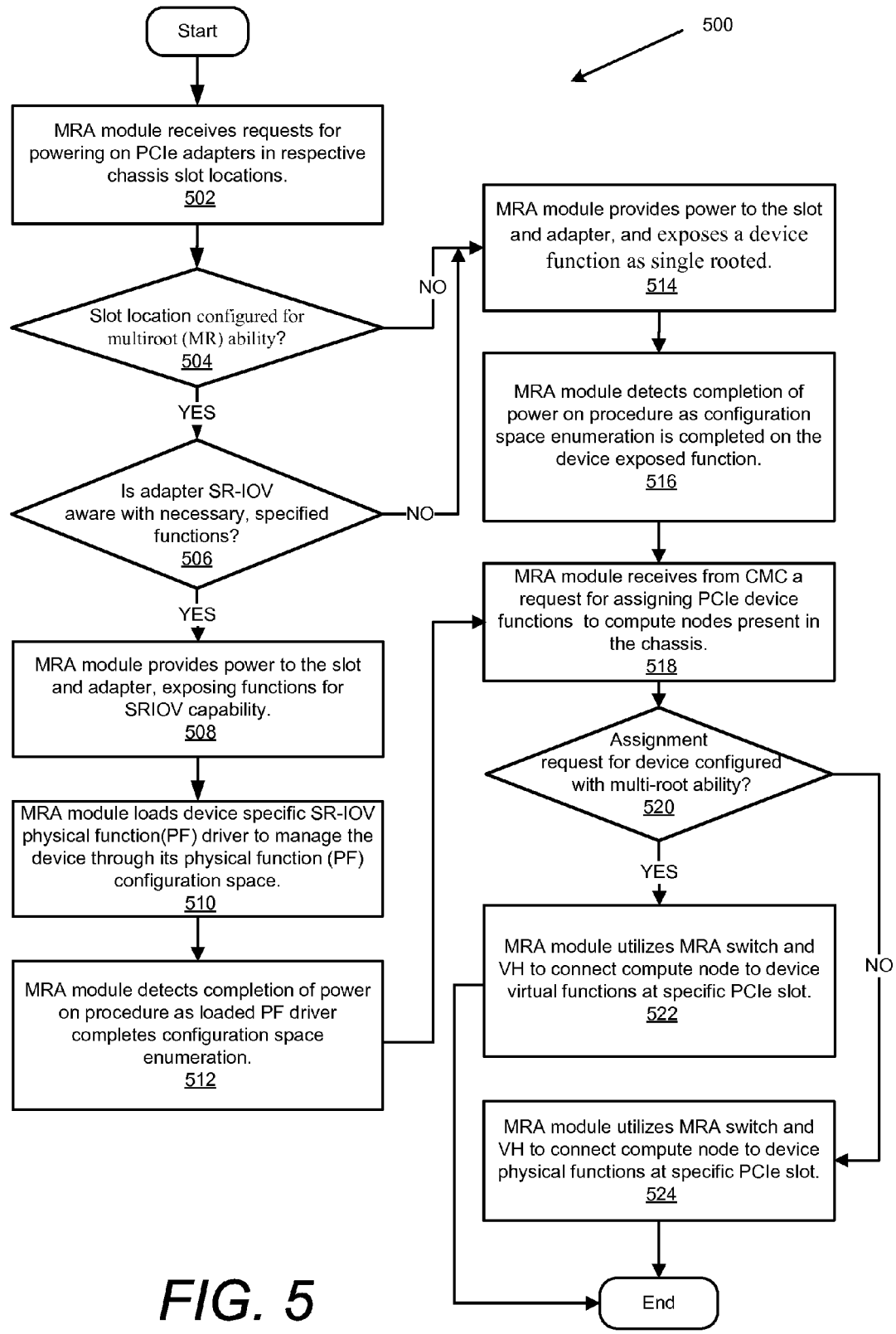
FIG. 5 is a flow chart illustrating a method for dynamically configuring a PCIe slot device coupled to an MRA switch for single root or multi-root ability within an IHS, according to one embodiment.

FIG. 5 presents a flowchart illustrating example methods by which IHS 100 and specifically MRA module 110 and/or MR-PCIM 108 presented within the preceding figures perform different aspects of the processes that enable one or more embodiments of the disclosure. Method 500 represents a method for dynamically and selectively configuring a PCIe slot device coupled to a MRA switch for one of single root ability and multi-root ability within IHS 100. The description of each method is provided with general reference to the specific components illustrated within the preceding figures. It is appreciated that certain aspects of the described methods may be implemented via other processing devices and/or execution of other code/firmware. In the discussion of FIG. 5, reference is also made to elements described in FIGS. 1-4.

Method 500 begins at the start block and proceeds to block 502 at which MRA module 110 receives from CMC 116 requests for power to be supplied to PCIe adapters in respective chassis slot locations. MRA module 110 determines whether a slot location(s) allocated to the PCIe adapter(s) for which power is requested is configured for multi-root ability (i.e., a specific slot in the user provided slot configuration map is configured for multi-root ability) (decision block 504). If MRA module 110 determines that the slot is configured for single root ability, as opposed to a multi-root ability, MRA module 110 provides power to the slot and adapter, and exposes a device function as single rooted (i.e., unshared) (block 514). If MRA module 110 determines that the slot is configured for multi-root ability, MRA module 110 determines whether the PCIe adapter is SR-IOV aware with necessary functions as defined in the PCIe MR-IOV specification (decision block 506). If MRA module 110 determines that the PCIe adapter is SR-IOV aware and has the specified functions, MRA module 110 provides power to the designated slot and SR-IOV PCIe adapter 312, and exposes functions for SR-IOV capability (block 508). In particular, SR-IOV PCIe adapter 312 is powered on with SR-IOV capability with physical and virtual functions (PF and VFs) exposed for use by management and compute nodes. MRA module 110 loads device specific SR-IOV physical function (PF) driver within SR-IOV PCIe adapter 312 to manage SR-IOV PCIe adapter 312 via a corresponding physical function (PF) configuration space (block 510). However, the virtual device functions (VFs) can be assigned to compute nodes to be utilized by VMM/Hypervisor 140 or by the VMs as desired/managed by VMM 140. MRA module 110 detects completion of a power-on procedure as loaded PF driver completes configuration space enumeration (block 512). However, if MRA module 110 determines that the PCIe adapter is not SR-IOV aware and does not have the specified functions, MRA module 110 provides power to the slot and PCIe adapter 322, and exposes a device function as single rooted (block 514). MRA module 110 detects completion of the power-on procedure as configuration space enumeration on the device exposed function is completed, configuring PCIe adapter 322 as an unshared device (block 516). MRA module 110 receives from CMC 116 a request for assigning PCIe device functions to compute nodes present in the chassis (block 518). MRA module 110 determines whether a PCIe device configured multi-root ability is requested (decision block 520). If MRA module 110 determines that a PCIe device configured for multi-root ability is requested, MRA module 110 utilizes MRA switch 150 and VH (e.g., first virtual hierarchy 342) to connect compute node (e.g., fourth root blade 304) to device virtual functions at specific/assigned PCIe slot (block 522). However, if MRA module 110 determines that a PCIe device configured for single root ability, as opposed to a multi-root ability, is requested, MRA module 110 utilizes MRA switch 150 and VH0 340 to connect compute node to device physical functions at specific/assigned PCIe slot (block 524). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   a processor;
   a memory system communicatively coupled to the processor;
   a multi-root aware (MRA) PCIe switch comprising a plurality of root endpoint ports and a plurality of input/output (I/O) adapter endpoint ports;
   at least one host compute node;
   a plurality of I/O adapter clusters including a first adapter cluster configured with multi-root ability and a second adapter cluster configured with single root ability, each cluster having at least one I/O adapter;
   a management/controller entity comprising:
      a chassis management controller (CMC) that receives one or more user requests for a PCIe adapter that triggers a power-on process initiation request for one or more I/O adapter devices; and
      a multi-root PCIe manager node (MR-PCIM) that receives the request from the CMC, and which manages the MRA PCIe switch and associated PCIe sub-system;
   wherein the MR-PCIM:
      determines whether a chassis PCIe slot location assigned to an I/O adapter device is designated as a multi-root (MR) device slot;
      in response to determining that the chassis PCIe slot location assigned to the I/O adapter device is designated as a multi-root (MR) device slot, determines whether the I/O adapter is SR-IOV aware with specific functions to support an MRA switch plug-in;
      in response to determining that the I/O adapter is SR-IOV aware with specific functions to support an MRA switch plug-in:
         provides power to the slot and adapter; and
         configures the I/O adapter with multi-root ability by exposing functions for SR-IOV capability; and
      in response to determining that the chassis PCIe slot location assigned to the I/O adapter device for which power is requested is designated as a single root (SR) device slot as opposed to an MR device slot:
         provides power to the slot and adapter; and
         configures the I/O adapter with single root ability.

2. The IHS of claim 1, wherein the MR-PCIM:
   in response to determining that the first I/O adapter cluster is SR-IOV aware and has specific functions to enable the I/O adapter to be connected to the MRA switch:
      provides power to chassis slots and respective I/O adapters; and
      loads within respective I/O adapters the device specific SR-IOV physical function driver.

3. The IHS of claim 1, wherein the MR-PCIM:
   in response to determining that the I/O adapter is not SR-IOV aware and does not have the specific functions to support an MRA switch plug-in:
      provides power to the slot and adapter; and
      configures the I/O adapter for single rooted base device functionality.

4. The IHS of claim 1, wherein the MR-PCIM:
   receives a first request for power for a first I/O adapter assigned to a chassis slot location configured for the multi-root (MR) ability;
   receives a second request for power for a second I/O adapter assigned to a chassis slot location configured for the SR ability;
   configures the first I/O adapter with multiple root ability; and
   configures the second I/O adapter with single rooted base device ability.

5. The IHS of claim 1, wherein the MR-PCIM:
   receives at least one request from respective host compute nodes, including a first request for I/O adapter functionality from the first host compute node;
   determines from the received first request whether the first host compute node is requesting a device function from a multi-root configured device;
   in response to determining that the first host compute node is requesting a device function from a multi-root configured device, connects the first host compute node to virtual functions provided by an I/O adapter configured with the multi-root capability in the first adapter cluster and in the assigned chassis slot location; and
   in response to determining that the first host compute node has requested a device function from a single root configured device as opposed to a device function from a multi-root configured device, connects the first host compute node to physical functions provided by an I/O adapter configured with the single root capability in the second adapter cluster and in the assigned chassis slot location.

6. The IHS of claim 5, wherein the MR-PCIM:
   receives multiple requests to access I/O adapter functionality including the first request from the first host compute node and a second request from a second host compute node;
   determines from the first request that the first host compute node is requesting a device configured with MR ability;
   determines from the second request that the second host compute node is requesting a device configured with SR ability; and
   connects the second compute node to a physical function provided by an adapter configured with the SR ability in the second adapter cluster and in an assigned chassis slot location while connecting to one or more compute nodes including the first compute node virtual functions provided by an adapter configured with the MR ability in the first adapter cluster and in a corresponding chassis slot location.

7. The IHS of claim 1, wherein the MR-PCIM:
enables a user to respectively configure I/O adapter device slots for single root ability and multi-root ability by using a slot configuration map, wherein the user is able to dynamically update, on demand, based on end user preferences, the slot configuration map to make use of interfaces exposed by the CMC; and
dynamically configures respective devices as shared devices corresponding to slots configured for multi-root ability and unshared devices corresponding to slots configured for single root ability by utilizing the updated slot configuration map.

8. The IHS of claim 1, wherein the MR-PCIM:
routes VFs of SRIOV adapters through the MRA switch via the VH0 management interface; and
assigns the VH0 management interface to respective compute nodes to enable compute nodes to route base functions for single rooted devices to said compute nodes via the MRA switch.

9. The IHS of claim 1, wherein the MR-PCIM:
loads the at least one adapter in the first adapter cluster as shared device which can be connected to respective compute nodes via VH1 to VHN;
loads the at least one adapter in the second adapter cluster as an unshared device which can be connected to a single, respective compute node via a respective VH0;
wherein the at least one adapter in the first adapter cluster and the at least one adapter in the second adapter cluster are substantially identically configured as SR-IOV adapter devices; and
wherein an adapter cluster can include one or more of a local adapter device and a remote adapter device.

10. The IHS of claim 1, wherein the MR-PCIM:
in response to power on procedures being completed for corresponding adapter devices, determines whether a respective powered on device exposes multiple virtual functions as provided by SR-IOV devices in multi-root configured slots;
in response to determining that respective powered on devices expose multiple virtual functions, provides routing assignments that connects the virtual functions to respective compute nodes via corresponding virtual hierarchy connections exposed by the MRA switch; and
in response to determining that respective powered on devices expose single physical functions of respective adapter devices, provides routing assignments that connects the physical functions to respective compute nodes via corresponding virtual hierarchy connections exposed by the MRA switch.

11. The IHS of claim 1, wherein the MR-PCIM:
the PF driver identifies I/O adapter device settings and enumerates the configuration address space for the I/O adapter device's virtual functions, wherein the PF driver provides configuration space enumeration.

12. In an information handling system (IHS), a method comprising:
receiving from a chassis management controller (CMC) requests for power that indicates a power-on process initiation for one or more I/O adapter devices;
determining whether a chassis PCIe slot location assigned to an I/O adapter device for which power is requested is designated as a multi-root (MR) device slot;
in response to determining that the chassis PCIe slot location assigned to the I/O adapter device is designated as a multi-root (MR) device slot, determining whether the I/O adapter is SR-IOV aware with specific functions to support an MRA switch plug-in;
in response to determining that the I/O adapter is SR-IOV aware with specific functions to support an MRA switch plug-in:
providing power to the slot and adapter;
configuring the I/O adapter with multi-root ability by exposing functions for SR-IOV capability; and
in response to determining that the chassis PCIe slot location assigned to the I/O adapter device is designated as a single root (SR) device slot as opposed to an MR device slot:
providing power to the slot and adapter; and
configuring the I/O adapter with single root ability.

13. The method of claim 12, further comprising:
in response to determining that the first I/O adapter cluster is SR-IOV aware with specific functions to enable the first I/O adapter to be connected to the MRA switch:
providing power to chassis slots and respective I/O adapters; and
loading within respective I/O adapters the device specific SR-IOV physical function driver.

14. The method of claim 12, further comprising:
in response to determining that the I/O adapter is not SR-IOV aware and does not have the specific functions to support an MRA switch plug-in:
providing power to the slot and adapter; and
configuring the I/O adapter for single rooted base device functionality.

15. The method of claim 12, further comprising:
receiving a first request for power for a first I/O adapter assigned to a chassis slot location configured for the multi-root (MR) ability;
receiving a second request for power for a second I/O adapter assigned to a chassis slot location configured for the SR ability;
configuring the first I/O adapter with multiple root ability; and
configuring the second I/O adapter with single rooted base device ability.

16. The method of claim 12, further comprising:
receiving at least one request from respective host compute nodes, including a first request for I/O adapter functionality from the first host compute node;
determining from the received first request whether the first host compute node is requesting a device function from a multi-root configured device;
in response to determining that the first host compute node is requesting a device function from a multi-root configured device, connecting the first host compute node to virtual functions provided by an I/O adapter configured with the multi-root capability in the first adapter cluster and in the assigned chassis slot location; and
in response to determining that the first host compute node has requested a device function from a single root configured device as opposed to a device function from a multi-root configured device, connecting the first host compute node to physical functions provided by an I/O adapter configured with the single root capability in the second adapter cluster and in the assigned chassis slot location.

17. The method of claim 16, further comprising:
receiving multiple requests to access I/O adapter functionality including the first request from the first host compute node and a second request from a second host compute node;

determining from the first request that the first host compute node is requesting a device configured with MR ability;

determining from the second request that the second host compute node is requesting a device configured with SR ability; and connecting the second compute node to a physical function provided by an adapter configured with the SR ability in the second adapter cluster and in an assigned chassis slot location while connecting to one or more compute nodes including the first compute node virtual functions provided by an adapter configured with the MR ability in the first adapter cluster and in a corresponding chassis slot location.

18. The method of claim 17, further comprising:

enabling a user to respectively configure I/O adapter device slots for single root ability and multi-root ability by using a slot configuration map, wherein the user is able to dynamically update, on demand based on end user preferences, the slot configuration map to make use of interfaces exposed by the CMC; and dynamically configuring respective devices as shared devices corresponding to slots configured for multi-root ability and unshared devices corresponding to slots configured for single root ability by utilizing the updated slot configuration map.

19. The method of claim 12, further comprising:

routing VFs of SRIOV adapters through the MRA switch via the VH0 management interface; and assigning the VH0 management interface to respective compute nodes to enable compute nodes to route base functions for single rooted devices to said compute nodes via the MRA switch.

20. The method of claim 12, further comprising:

loading the at least one adapter in the first adapter cluster as shared device which can be connected to respective compute nodes via VH1 to VHN;

loading the at least one adapter in the second adapter cluster as an unshared device which can be connected to a single, respective compute node via a respective VH0;

wherein the at least one adapter in the first adapter cluster and the at least one adapter in the second adapter cluster are substantially identically configured as SR-IOV adapter devices; and wherein an adapter cluster can include one or more of a local adapter device and a remote adapter device.

21. The method of claim 20, further comprising:

in response to power on procedures being completed for corresponding adapter devices, determining whether a respective powered on device exposes multiple virtual functions as provided by SR-IOV devices in multi-root configured slots;

in response to determining that respective powered on devices expose multiple virtual functions, providing routing assignments that connects the virtual functions to respective compute nodes via corresponding virtual hierarchy connections exposed by the MRA switch; and in response to determining that respective powered on devices expose single physical functions of respective adapter devices, providing routing assignments that connects the physical functions to respective compute nodes via corresponding virtual hierarchy connections exposed by the MRA switch.

22. The method of claim 20, further comprising:

utilizing the PF driver to identify I/O adapter device settings and enumerate a configuration address space for virtual functions of the I/O adapter device, wherein the PF driver provides configuration space enumeration.

* * * * *